(12) United States Patent
Han et al.

(10) Patent No.: US 10,942,267 B2
(45) Date of Patent: Mar. 9, 2021

(54) VIDEO OBJECT PROCESSING

(71) Applicant: Advanced New Technologies Co., Ltd., George Town (KY)

(72) Inventors: Zhe Han, Hangzhou (CN); Lei Yang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/806,956

(22) Filed: Mar. 2, 2020

(65) Prior Publication Data

US 2020/0393560 A1 Dec. 17, 2020

Related U.S. Application Data

(63) Continuation of application No. PCT/CN2020/071265, filed on Jan. 10, 2020.

(30) Foreign Application Priority Data

Jun. 17, 2019 (CN) .......................... 201910523401.8

(51) Int. Cl.
*G01S 13/89* (2006.01)
*G08B 13/196* (2006.01)
*G01S 7/52* (2006.01)

(52) U.S. Cl.
CPC .......... *G01S 13/89* (2013.01); *G01S 7/52046* (2013.01); *G08B 13/19608* (2013.01); *G08B 13/19673* (2013.01)

(58) Field of Classification Search
CPC .................. G01S 13/89; G01S 7/52046; G08B 13/19608; G08B 13/19673
USPC .......................................................... 342/22
See application file for complete search history.

(56) References Cited

U.S. PATENT DOCUMENTS 3,541,249 A * 11/1970 Prince ................... G01S 3/7864
348/170
5,838,374 A * 11/1998 Kikuchi ............. H02K 41/0356
348/351

(Continued)

FOREIGN PATENT DOCUMENTS

| CN | 103561274 | 2/2014 |
|---|---|---|
| CN | 105933664 | 9/2016 |

(Continued)

OTHER PUBLICATIONS

Upadhyay et al., "Video Authentication—An Overview", International Journal of Computer Science & Engineering Survey, vol. 2, No. 4, pp. 75-96, Nov. 2011 (Year: 2011).*

(Continued)

*Primary Examiner* — Frank J McGue
(74) *Attorney, Agent, or Firm* — Fish & Richardson P.C.

(57) ABSTRACT

A computer-implemented method includes: determining, based on a video of a target area, a first number of target objects in the video at each of multiple time points, and a first location of each of the first number of target objects at the corresponding time points; receiving position signals of the corresponding target objects in the target area at each of the multiple time points; determining, based on the position signals, a second number of target objects at each of the multiple time points and a second location of each of the second number of target objects at the corresponding time points; determining that, at each of the multiple time points, the first number equals the second number; determining that, at each of the multiple time points, the first location of each target object matches the second location of the target object; and determining that the video is unmodified.

21 Claims, 7 Drawing Sheets

(56) References Cited

U.S. PATENT DOCUMENTS

| | | | | |
|---|---|---|---|---|
| 6,169,966 | B1* | 1/2001 | Miura | G06T 7/20 |
| | | | | 702/142 |
| 7,633,518 | B2* | 12/2009 | Beevor | G01V 11/00 |
| | | | | 348/143 |
| 9,386,282 | B2* | 7/2016 | Hazzani | G08B 13/19608 |
| 9,805,582 | B2* | 10/2017 | Jedwab | G08B 13/19654 |
| 2016/0080703 | A1* | 3/2016 | Wang | H04N 7/183 |
| | | | | 348/143 |
| 2016/0358436 | A1 | 12/2016 | Wautier et al. | |
| 2018/0267142 | A1* | 9/2018 | Motoyama | G01S 13/86 |

FOREIGN PATENT DOCUMENTS

| | | |
|---|---|---|
| CN | 106373394 | 2/2017 |
| CN | 108139475 | 6/2018 |
| CN | 110263700 | 9/2019 |
| JP | 2001343453 | 12/2001 |
| JP | 2006292475 | 10/2006 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2020/071265, dated Apr. 13, 2020, 19 pages (with machine translation).

\* cited by examiner

VIDEO OBJECT PROCESSING

CROSS-REFERENCE TO RELATED APPLICATIONS

This application is a continuation of PCT Application No. PCT/CN2020/071265, filed on Jan. 10, 2020, which claims priority to Chinese Patent Application No. 201910523401.8, filed on Jun. 17, 2019, and each application is hereby incorporated by reference in its entirety.

TECHNICAL FIELD

One or more implementations of the present specification relate to the field of video processing technologies, and in particular, to video processing methods, apparatuses, and devices, and video surveillance systems.

BACKGROUND

A video surveillance system is an important part of a security defense system. The video surveillance system is widely used in security surveillance in various places (such as a work place, an office place, an entertainment place, a home, and a shopping mall). Generally, a user can use video images captured by the video surveillance system to monitor a place concerned by the user. Without technical verification, it is difficult for the user to identify authenticity of a video image captured by the video surveillance system.

SUMMARY

One or more implementations of the present specification provide video processing methods, apparatuses, and devices, and video surveillance systems, which can accurately and efficiently determine authenticity of a video image.

One or more implementations of the present specification provide the following technical solutions:

According to a first aspect, a video processing method is provided and includes the following: determining, based on a video image of a target area, a quantity of to-be-verified target objects in the video image at each of multiple moments and a to-be-verified location of each to-be-verified target object; receiving positioning signals of the target objects in the target area at each moment; determining, based on the positioning signals, a quantity of target objects positioned at each moment and a positioning location of each positioned target object; and determining that the video image is an unmodified video image if the quantity of to-be-verified target objects is the same as the quantity of positioned target objects at each of the multiple moments, and the to-be-verified location of each to-be-verified target object matches a positioning location of the target object.

According to a second aspect, a video processing apparatus is provided and includes the following: a video detection unit, configured to determine, based on a video image of a target area, a quantity of to-be-verified target objects in the video image at each of multiple moments and a to-be-verified location of each to-be-verified target object; a signal receiving unit, configured to receive positioning signals of the target objects in the target area at each moment; a signal processing unit, configured to determine, based on the positioning signals, a quantity of target objects positioned at each moment and a positioning location of each positioned target object; and a comparison and analysis unit, configured to determine that the video image is an unmodified video image if the quantity of to-be-verified target objects is the same as the quantity of positioned target objects at each of the multiple moments, and the to-be-verified location of each to-be-verified target object matches a positioning location of the target object.

According to a third aspect, a video processing device is provided, where the device includes a processor and a memory that stores computer program instructions; and when executing the computer program instructions, the processor implements the video processing method according to the first aspect.

According to a fourth aspect, a video surveillance system is provided and includes the following: a video collection device, configured to collect a video image of a target area; a signal acquisition device, configured to obtain positioning signals of target objects in the target area at each of multiple moments; and a video processing device, configured to determine, based on the video image, a quantity of to-be-verified target objects in the video image at each moment and a to-be-verified location of each to-be-verified target object; determine, based on the positioning signals, a quantity of target objects positioned at each moment and a positioning location of each positioned target object; and determine that the video image is an unmodified video image if the quantity of to-be-verified target objects is the same as the quantity of positioned target objects at each of the multiple moments, and the to-be-verified location of each to-be-verified target object matches a positioning location of the target object.

According to the one or more implementations of the present specification described above, the positioning signals can be used to determine the quantity of target objects positioned at each of the multiple moments and the positioning location of each positioned target object, so as to match the quantity of to-be-verified target objects at each moment and the to-be-verified location of each to-be-verified target object, where the quantity of to-be-verified target objects and the to-be-verified location of each to-be-verified target object are determined based on the video image. If the quantity of to-be-verified target objects is the same as the quantity of positioned target objects at each of the multiple moments, and the to-be-verified location of each to-be-verified target object matches a positioning location of the target object, it can be determined that the video image is an unmodified video image. Therefore, authenticity of the video image can be accurately and efficiently determined without performing technical verification on the video image, thereby achieving simpler video image authenticity determination and reducing costs for performing the video image authenticity determination.

BRIEF DESCRIPTION OF DRAWINGS

To describe the technical solutions in one or more implementations of the present specification more clearly, the following briefly describes the accompanying drawings needed in the one or more implementations of the present specification. A person of ordinary skill in the art can still derive other drawings from these accompanying drawings without creative efforts.

DESCRIPTION OF IMPLEMENTATIONS

The following describes in detail features and example implementations of various aspects of the present specification. To make objectives, technical solutions, and advantages of the present specification clearer, the following further describes the present specification in detail with reference to the accompanying drawings and specific implementations. It should be understood that, the described implementations here are merely some but not all of the implementations of the present specification. A person skilled in the art can implement the present specification without some of these specific details. The following descriptions of the implementations are merely intended to provide a better understanding of the present specification by illustrating examples of the present specification.

It should be noted that in the present specification, relational terms such as "first" and "second" are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or a device that includes a list of elements not only includes those elements but also includes other elements which are not expressly listed, or further includes elements inherent to such a process, method, article, or device. An element preceded by "includes . . . " does not, without more constraints, preclude the existence of additional identical elements in the process, method, article, or device that includes the element.

Figure 1:
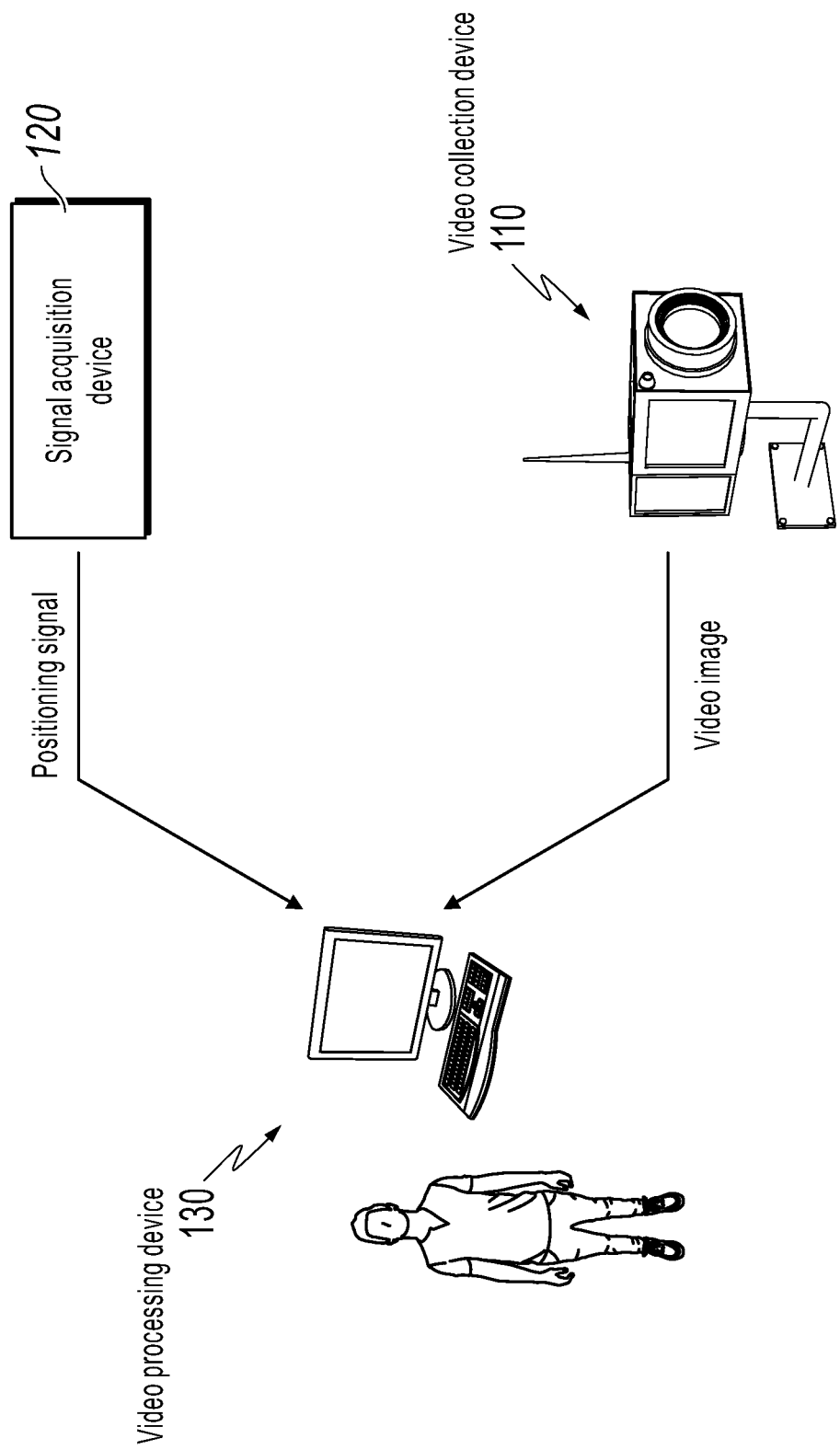
FIG. 1 is an architectural diagram illustrating a video surveillance system, according to an example of the present specification.

FIG. 1 is an architectural diagram illustrating a video surveillance system, according to an example of the present specification. As shown in FIG. 1, the video surveillance system includes a video collection device 110, a signal acquisition device 120, and a video processing device 130. The video collection device 110 is configured to collect a video image of a target area. The signal acquisition device 120 is configured to obtain positioning signals of target objects in the target area at each of multiple moments. The video processing device 130 is configured to determine authenticity of the video image by using the positioning signals. Therefore, the video surveillance system can accurately and efficiently determine authenticity of the video image without performing technical verification on the video image, thereby achieving simpler video image authenticity determination and reducing costs for performing the video image authenticity determination.

Specifically, the video processing device 130 can determine, based on the video image collected by the video collection device 110, a quantity of to-be-verified target objects in the video image at each moment and a to-be-verified location of each to-be-verified target object; and receive the positioning signals obtained by the signal acquisition device 120, and determine, based on the positioning signals, a quantity of target objects positioned at each moment and a positioning location of each positioned target object. Then, the video processing device 130 can determine whether the video image is an unmodified video image based on the quantity of to-be-verified target objects in the video image at each moment, the to-be-verified location of each to-be-verified target object, the quantity of target objects positioned at each moment and the positioning location of each positioned target object: determine that the video image is an unmodified video image if the quantity of to-be-verified target objects is the same as the quantity of positioned target objects at each of the multiple moments, and the to-be-verified location of each to-be-verified target object matches a positioning location of the target object; or determine that the video image is a modified video image if the quantity of to-be-verified target objects is different from the quantity of positioned target objects at each of the multiple moments, or a to-be-verified location of any to-be-verified target object does not match a positioning location of the target object.

The video collection device 110 described in the present specification can include a camera.

In an implementation of the present specification, the camera can include an RGB-Depth (RGBD) camera. In this case, one video collection device 110 can be used to collect video images of all target areas, or multiple video collection devices 110 can be used to collect video images of corresponding parts of the target areas. In another implementation of the present specification, the camera can include a common video camera that uses a common camera lens. In this case, multiple video collection devices 110 can be used to collect video images of corresponding parts of the target areas.

Specifically, when there are multiple video collection devices 110, a midpoint of the target area can be used as a center. The target area can be divided into sub-areas, and a quantity of the video collection devices 110 is the same as a quantity of the sub-areas. All the sub-areas has a same size. The video collection devices 110 can be evenly arranged along a circumferential direction of the target area, so that each video collection device 110 collects a video image corresponding to one sub-area. In addition, the video image collected by each video collection device 110 can include only a sub-area corresponding to the video collection device 110, or can include the sub-area and a part or a whole of an adjacent sub-area, or can include the entire target area.

In an implementation of the present specification, the signal acquisition device 120 can include at least one radars, and the at least one radars is evenly arranged along the circumferential direction of the target area. Specifically, the radar can include a millimeter wave radar. Working in a millimeter wave band, the millimeter wave radar not only features a strong capability of penetrating fog, smoke, and dust, but also is capable of measurement and positioning of a distance, a direction, a frequency, and a spatial location with high precision. Therefore, when the millimeter wave radar is used to obtain positioning signals, a positioning location of a target object detected by the millimeter wave radar is more accurate, and reliability of a detection result of video image authenticity can be improved.

Figure 2:
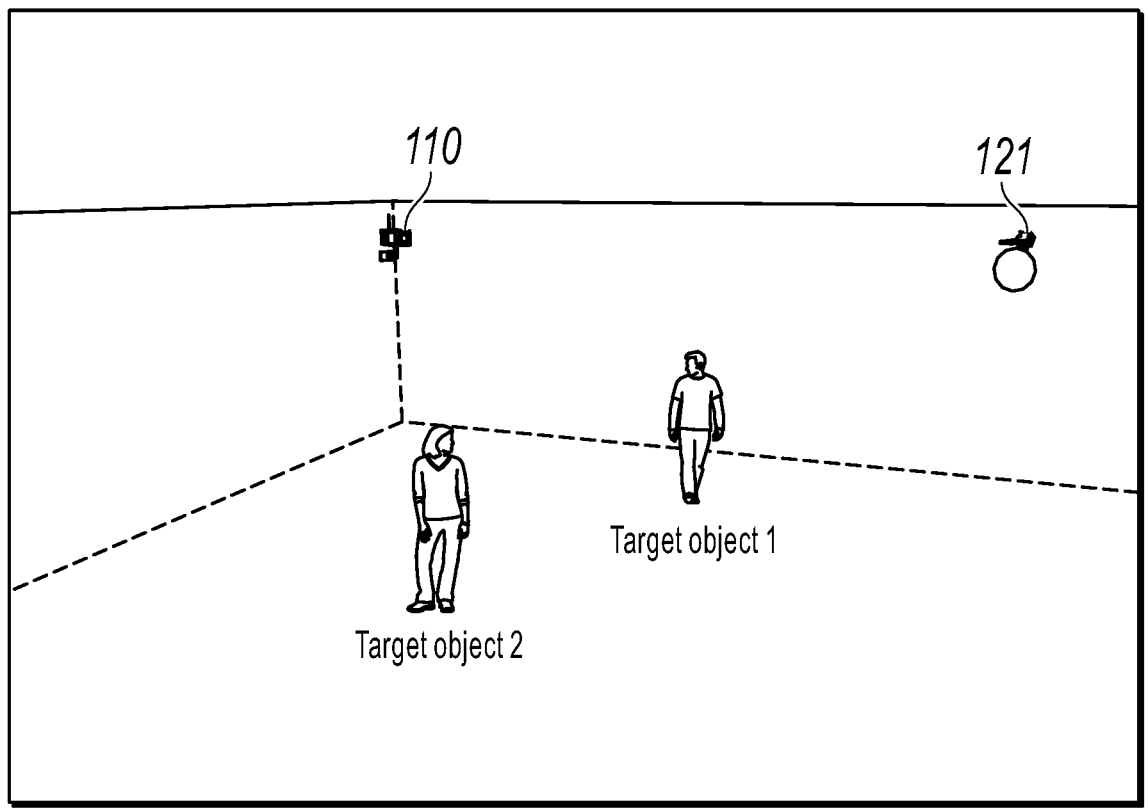
FIG. 2 is an arrangement diagram illustrating a signal acquisition device, according to an implementation of the present specification.

FIG. 2 is an arrangement diagram illustrating a signal acquisition device, according to an implementation of the present specification. A video surveillance system in the implementation includes a video collection device 110 and a radar 121. As shown in FIG. 2, both the video collection device 110 and the radar 121 are disposed at a top corner of a room, so that video images captured by the video collection device 110 can be used to more accurately identify all target object images in a target area and positioning signals collected by the radar 121 can be used to more accurately identify all target objects in the target area. However, it should be noted that positions of the video collection device 110 and the radar 121 are not limited, and the video collection device 110 and the radar 121 can alternatively be disposed in other positions on a ceiling of the room, provided that all target object images of the target area can be identified by using the video images, and positioning locations of all target objects in the target area can be detected by using the radar 121.

In another implementation of the present specification, a signal acquisition device 120 can further include at least three radio receivers, and the at least three radio receivers can be arrayed in a target area. When the signal acquisition device 120 includes at least three radio receivers, a target object in the target area needs to carry a radio transmitter to generate radio waves, so that the radio receivers can obtain signals indicating received signal strength indicators (RSSIs) of received radio waves. A radio wave can be a radio signal having an identification code. Therefore, multiple RSSIs corresponding to radio waves transmitted by a same radio transmitter can be found through matching among multiple signals received by different radio receivers and indicating RSSIs of received radio waves. Specifically, in an implementation of the present specification, the radio receiver can be a Bluetooth signal receiver (Bluetooth signal scanner), and correspondingly, the radio transmitter can be a Bluetooth signal transmitter. In another implementation of the present specification, the radio receiver can alternatively be a Wi-Fi signal receiver, and correspondingly, the radio transmitter can be a Wi-Fi signal transmitter. In still another implementation of the present specification, the radio receiver can alternatively be an ultra-wideband (UWB) signal receiver, and correspondingly, the radio transmitter can be a UWB signal transmitter.

Figure 3:
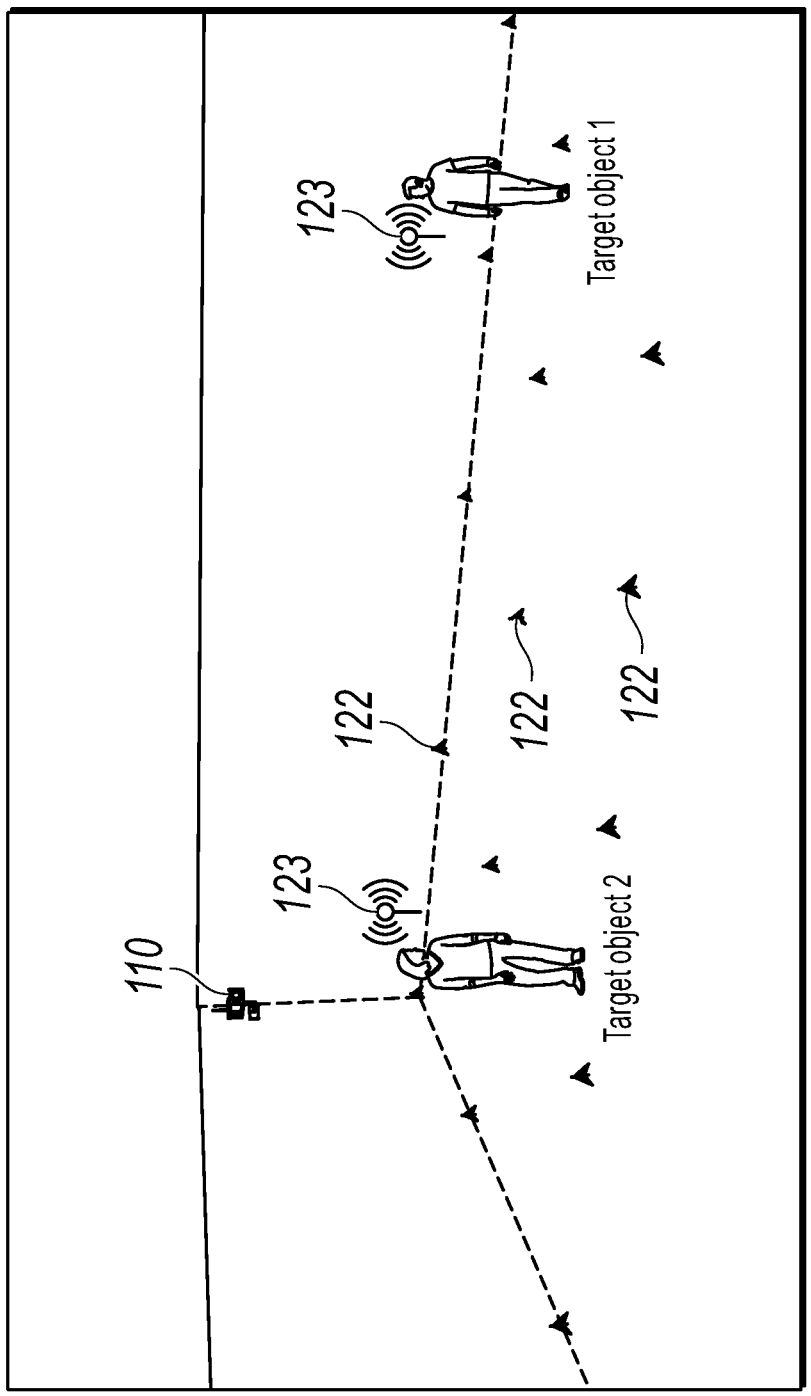
FIG. 3 is an arrangement diagram illustrating a signal acquisition device, according to another implementation of the present specification.

FIG. 3 is an arrangement diagram illustrating a signal acquisition device, according to another implementation of the present specification. A video surveillance system in the implementation includes one video collection device 110 and 15 Bluetooth signal receivers 122. Because signal receiving distances of the Bluetooth signal receivers 122 are limited, the Bluetooth signal receivers 122 need to be arrayed in a target area based on their signal receiving distances. As shown in FIG. 3, the Bluetooth signal receivers 122 are distributed in the target area in a 3*5 matrix array. In addition, as shown in FIG. 3, the video collection device 110 is disposed at a top corner of a room, so that video images captured by the video collection device 110 can be used to more accurately identify all target object images in the target area. However, it should be noted that, a position of the video collection device 110 is not limited, and the video collection device 110 can be disposed in another position on a ceiling of the room, provided that all target object images in the target area can be identified by using the video images. In addition, the Bluetooth signal receivers 122 can also be disposed on the ceiling of the room in the target area, provided that the Bluetooth signal receivers 122 can receive radio waves.

For cooperation with the Bluetooth signal receivers 122 to obtain positioning signals, in the implementation shown in FIG. 3, target object 1 and target object 2 each carry a Bluetooth signal transmitter 123 that is configured to send a radio wave. Using target object 1 as an example, the radio wave transmitted by the Bluetooth signal transmitter 123 carried by target object 1 can enable some Bluetooth signal receivers 122 near target object 1 in the target area or all Bluetooth signal receivers 122 in the target area to receive the radio wave transmitted by the Bluetooth signal transmitter 123 carried by target object 1. As such, the Bluetooth signal receivers 122 that receive the radio wave can obtain a signal indicating an RSSI of the received radio wave.

In still another implementation of the present specification, a signal acquisition device 120 can alternatively include at least one radar and at least three radio receivers. The radar and the radio receivers are distributed in the same way as in the implementation above, and details are omitted here for simplicity.

The following describes in detail a video processing method used in the video surveillance system above. The video processing method can be applied to the video processing device in the video surveillance system.

Figure 4:
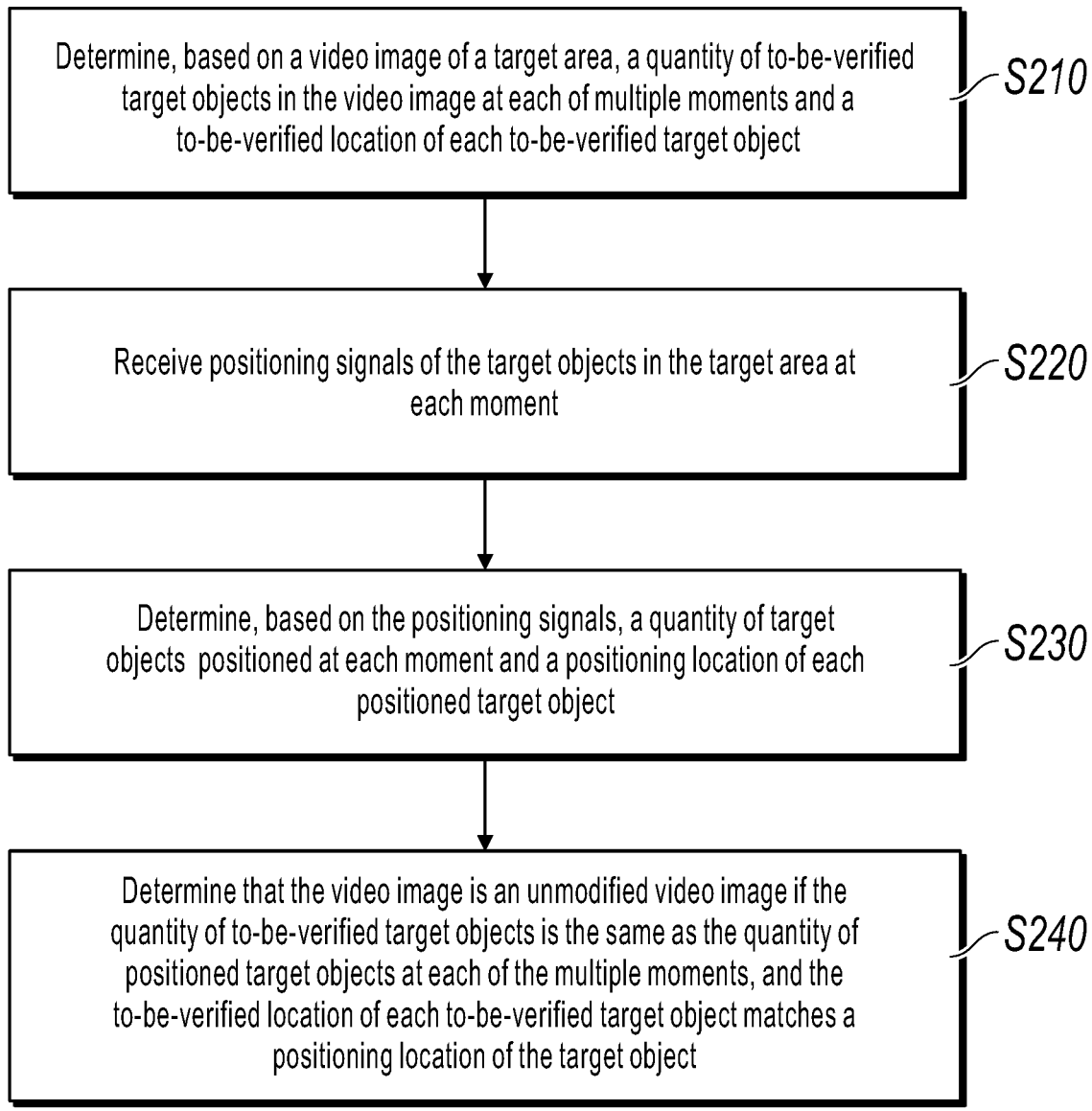
FIG. 4 is a schematic flowchart illustrating a video processing method, according to an implementation of the present specification.

FIG. 4 is a schematic flowchart illustrating a video processing method, according to an implementation of the present specification. As shown in FIG. 4, the video processing method includes the following steps:

S210: Determine, based on a video image of a target area, a quantity of to-be-verified target objects in the video image at each of multiple moments and a to-be-verified location of each to-be-verified target object.

S220: Receive positioning signals of the target objects in the target area at each moment.

S230: Determine, based on the positioning signals, a quantity of target objects positioned at each moment and a positioning location of each positioned target object.

S240: Determine that the video image is an unmodified video image if the quantity of to-be-verified target objects is the same as the quantity of positioned target objects at each of the multiple moments, and the to-be-verified location of each to-be-verified target object matches a positioning location of the target object.

Therefore, according to the implementation of the present specification, authenticity of the video image can be accurately and efficiently determined without performing technical verification on the video image, thereby achieving simpler video image authenticity determination and reducing costs for performing the video image authenticity determination.

In the present specification, the target object can be a person in the target area, or can be an article in the target area.

In step S210 of the present specification, when there is one video collection device and the target object is a person, using one of multiple moments as an example, a specific method for determining the quantity of to-be-verified target objects in the video image and the to-be-verified location of each to-be-verified target object can be as follows: A target object image in one frame of image corresponding to the moment is identified by using a facial recognition technology (or an image recognition technology), and a quantity of target object images is the quantity of to-be-verified target objects. Then, a relative location and a relative size of each target object image in the frame of image are determined, so that the relative size and the relative location of each target object image can be used to calculate a to-be-verified location on a two-dimensional plane for each to-be-verified target object in the target area at the moment. When there are multiple video collection devices, a specific method for determining the quantity of to-be-verified target objects and the to-be-verified location of each to-be-verified target object is similar to the method described above. A difference lies only in the following: When a same to-be-verified target object exists in video images collected by multiple video collection devices, a relative size and a relative location of the to-be-verified target object in the multiple video images can be used to cooperatively calculate the to-be-verified location of the to-be-verified target object.

In step 220 of the present specification, the positioning signals include signals obtained by a radar and indicating location coordinates of the target objects and/or signals obtained by at least three radio receivers and indicating RSSIs of received radio waves.

The following separately describes specific methods of step S230 of the present specification when the obtained positioning signals are different.

Case 1:

In case 1, the positioning signals include the signals obtained by the radar and indicating the location coordinates of the target objects.

It can be determined from a working principle of the radar that, when the radar is used to position multiple target objects in the target area, the radar can directly detect location coordinates of each target object in the target area, and generate a positioning signal based on the location coordinates of each target object. Therefore, in case 1, the specific method of step S230 can include the following: determining, based on the signals indicating the location coordinates of the target objects, a quantity of positioned location coordinates as the quantity of target objects positioned at each moment; and determining, based on the signals indicating the location coordinates of the target objects, location coordinates of multiple positioned target objects as the positioning location of each positioned target object at each moment.

It can be seen that, when the radar is used to detect positioning signals, location coordinates of multiple target objects in the target area at each moment can be directly obtained.

However, during radar detection, an object that blocks a radar signal reflects the radar signal to the radar, and consequently the radar detects an object other than a target one. When the target object is a moving person or a large moving article, a positioning location of a non-target object can be excluded based on a moving speed because a moving speed of the target object falls in a predetermined speed range. Specifically, the moving speed can be determined by the radar based on the Doppler effect and a receiving frequency of signals returned by a same target object.

In the present specification, when the target objects are moving persons or large moving articles, the positioning signals further include signals obtained by the radar and indicating moving speeds of the target objects. Before step 230, the method can further include the following: determining moving speeds of multiple target objects based on the signals indicating the moving speeds of the target objects; and correcting, based on the moving speeds and a predetermined speed range, the quantity of target objects positioned at each moment and the positioning location of each positioned target object.

In other words, in the present specification, all positioning locations obtained by the radar are first used as positioning locations of the target objects, and then based on a moving speed of a target object corresponding to each positioning location, a positioning location beyond the predetermined speed range is removed as a non-target object, so that filtered positioning locations are obtained to correct the obtained quantity of target objects positioned at each moment and the positioning location of each positioned target object.

Therefore, in this case, the positioning locations of the target objects can be determined without cooperation with the target objects, so as to determine authenticity of the video image.

Case 2:

In case 2, the positioning signals comprise the signals obtained by the at least three radio receivers and indicating the RSSIs of the received radio waves, and the radio waves are radio signals having identification codes and transmitted by radio transmitters carried by the target objects.

For example, the radio receivers are Bluetooth signal receivers and the radio transmitters are Bluetooth signal transmitter. It can be determined from a working principle of a Bluetooth signal receiver that, when the Bluetooth signal receivers are used to position multiple target objects in the target area, because the Bluetooth signal receivers are not directional, the signals indicating the RSSIs of the received radio waves can be obtained, and distances between the target objects and the Bluetooth signal receivers can be calculated by using the RSSIs. It can be determined from a three-point positioning method that, when locations of the three Bluetooth signal receivers that receive Bluetooth signals and the distances between the target objects and each of the three Bluetooth signal receivers are known, specific locations of the target objects can be calculated. Therefore, in case 2, a specific method of step S230 can include the following: determining, based on the signals indicating the RSSIs of the received radio waves, a quantity of the obtained identification codes as the quantity of target objects positioned at each moment; and determining, based on RSSIs of three radio waves corresponding to each obtained identification code, a coordinate location of each identification code as the positioning location of each positioned target object at each moment.

A shorter distance from a Bluetooth signal receiver indicates a more accurate distance calculated by using an RSSI. Therefore, in some implementations of the present specification, because each Bluetooth signal transmitter has a unique identification code, three maximum RSSIs corresponding to the identification code can be selected, and a distance between a target object corresponding to the identification code and each of Bluetooth signal receivers corresponding to the three RSSIs can be calculated by using the three RSSIs. Finally, a coordinate location corresponding to the identification code can be calculated by using the calculated distances and locations of the Bluetooth signal receivers corresponding to the three RSSIs in the target area.

In the present specification, when determining the quantity of target objects, the signals obtained by the multiple Bluetooth signal receivers and indicating the RSSIs of the received radio waves can be first summarized, identification codes corresponding to the multiple target objects can be determined based on the obtained signals, and finally the quantity of target objects can be obtained based on a quantity of the identification codes.

Therefore, in this case, the locations of the target objects can be calculated more accurately. In addition, because there is no signal interference, such a case is not only applicable to obtaining a positioning signal of a target object that is a moving person or a large moving article, but also applicable to obtaining a positioning signal of a stationary person and article.

Case 3:

In case 3, the positioning signals include the signals obtained by the radar and indicating the location coordinates of the target objects and the signals obtained by the at least three radio receivers and indicating the RSSIs of the received radio waves. Case 3 is applicable to obtaining positioning locations of all persons or articles in the target area. In addition, one of the positioning signals can be selected to detect a positioning location of a target object as needed. As such, a detection method is more flexible.

In step S240 of the present specification, it can be determined that the video image is an unmodified video image only when the quantity of to-be-verified target objects is the same as the quantity of positioned target objects at each of the multiple moments, and the to-be-verified location of each to-be-verified target object matches a positioning location of the target object.

That the to-be-verified location of each target object matches a positioning location of the target object means the following: A one-to-one corresponding positioning location can be identified for the to-be-verified location of each target object, and the to-be-verified location falls in an error range corresponding to the positioning location.

Figure 5:
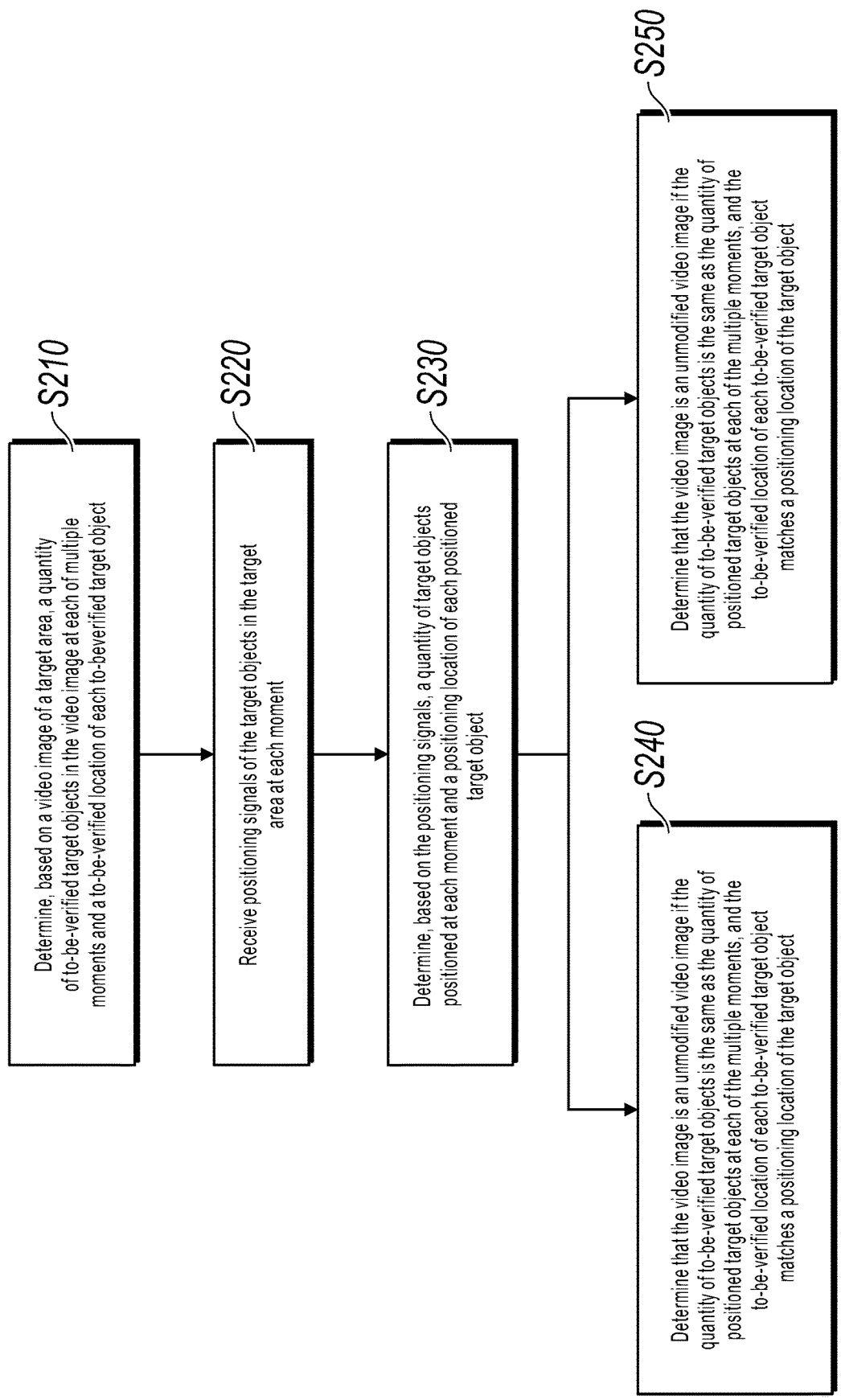
FIG. 5 is a schematic flowchart illustrating a video processing method, according to another implementation of the present specification.

FIG. 5 is a schematic flowchart illustrating a video processing method, according to another implementation of the present specification. As shown in FIG. 5, the video processing method further includes the following:

S250: Determine that the video image is a modified video image if the quantity of to-be-verified target objects is different from the quantity of positioned target objects at each of the multiple moments, or a to-be-verified location of any to-be-verified target object does not match a positioning location of the target object.

In the present specification, at least one frame of image may be modified in a video image, for example, a particular target object is removed, or a moving track of a particular target object is changed. Therefore, it can be determined that the video image is a modified video image when the quantity of to-be-verified target objects is different from the quantity of positioned target objects at each of the multiple moments and/or the to-be-verified location of any to-be-verified target object does not match a positioning location of the target object.

In an implementation of the present specification, when the positioning signals include the signals obtained by the at least three radio receivers and indicating the RSSIs of the received radio waves, the video processing method can further include the following: determining mapping relationships between the multiple obtained identification codes and multiple target object images in the video image.

Specifically, a to-be-verified location of a to-be-verified target object can be identified by using a positioning location of a target object corresponding to each identification code, so as to establish a mapping relationship between each identification code and a corresponding target object image in the video image.

In the implementation, the video processing method can further include the following: determining, based on a target identification code and the mapping relationships, a target object image corresponding to the target identification code; and generating video content corresponding to the target identification code based on a location and a predetermined size of the target object image corresponding to the target identification code in the video image at each moment.

For example, a parent wants to obtain video content of his/her child. An identification code corresponding to a radio transmitter carried by the child of the parent is used as a target identification code. A target object image corresponding to the target identification code can be identified from a video image by using a mapping relationship and the target identification code. Then, for a frame of image corresponding to each of multiple moments, a location of a center point of a target object image in the frame of image and a predetermined size can be determined, to obtain a captured image corresponding to the target object image in each frame of image, and then video content corresponding to the target identification code can be generated by using all captured images, so that the parent can determine a study status of his/her child by using the video content instead of a video image of an entire classroom, thereby ensuring privacy of other children.

For another example, a supermarket manager wants to know a work status of any employee in a day. According to the method described above, the supermarket manager can quickly determine the work status of the employee in the day by obtaining video content of the employee, and does not need to search a video image for the employee. Therefore, a time needed for assessing staff by the supermarket manager can be reduced.

In an implementation of the present specification, the predetermined size can be a predetermined size of a captured image, that is, an image of the predetermined size is fixedly captured in the video image. In another implementation of the present specification, the predetermined size can further be a predetermined image extension size, that is, a size of the target object image can be extended to the predetermined size and the obtained size can be used as an image size for capturing.

In conclusion, according to the video processing method in the one or more implementations of the present specification, a video image and a positioning signal can be both collected, and an actual status of a target object in a target area can be identified by using the positioning signal, so as to determine whether the video image is modified. In addition, the positioning signal can be obtained by using a signal acquisition device, and a moving route of the target object can also be simply determined, so as to assist crowd tracking by using the video image, thereby improving accuracy of video image detection.

Figure 6:
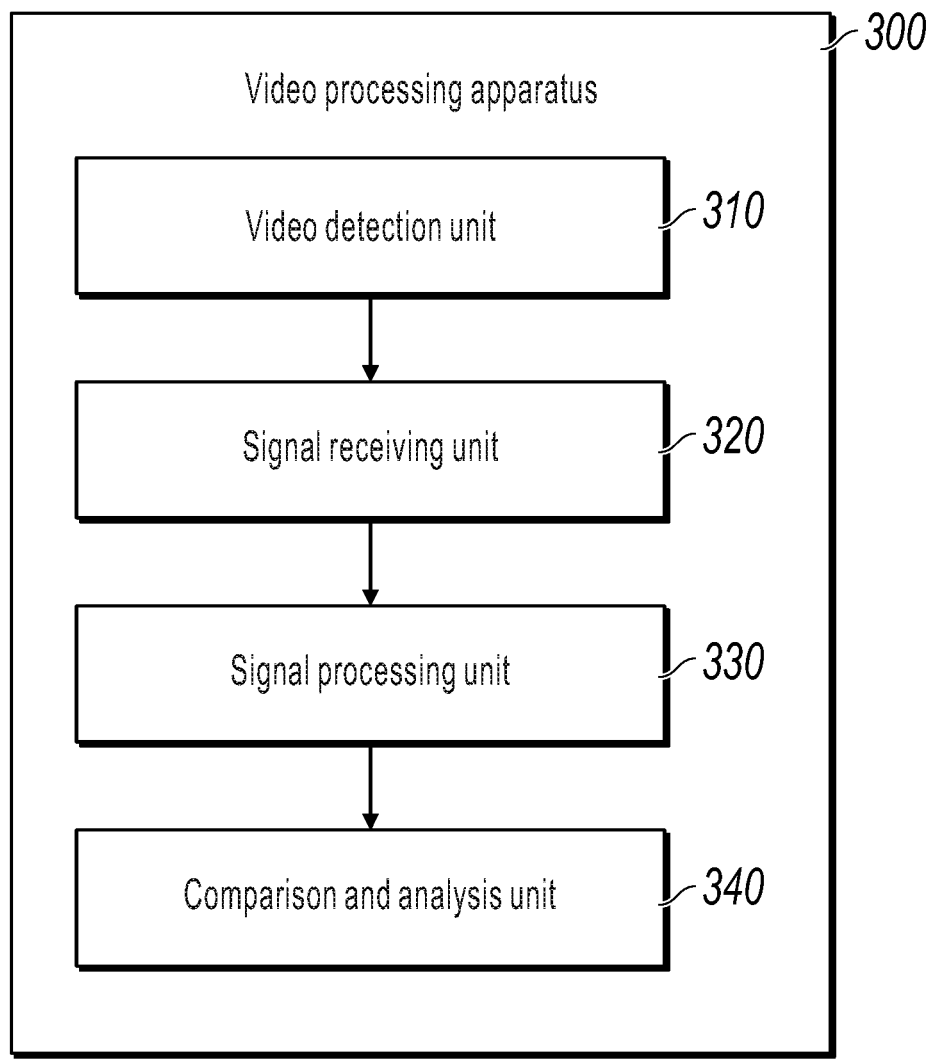
FIG. 6 is a schematic structural diagram illustrating a video processing apparatus, according to an implementation of the present specification.

FIG. 6 is a schematic structural diagram illustrating a video processing apparatus, according to an implementation of the present specification. As shown in FIG. 6, the video processing apparatus 300 includes the following: a video detection unit 310, configured to determine, based on a video image of a target area, a quantity of to-be-verified target objects in the video image at each of multiple moments and a to-be-verified location of each to-be-verified target object; a signal receiving unit 320, configured to receive positioning signals of the target objects in the target area at each moment; a signal processing unit 330, configured to determine, based on the positioning signals, a quantity of target objects positioned at each moment and a positioning location of each positioned target object; and a comparison and analysis unit 340, configured to determine that the video image is an unmodified video image if the quantity of to-be-verified target objects is the same as the quantity of positioned target objects at each of the multiple moments, and the to-be-verified location of each to-be-verified target object matches a positioning location of the target object; or determine that the video image is a modified video image if the quantity of to-be-verified target objects is different from the quantity of positioned target objects at each of the multiple moments, or a to-be-verified location of any to-be-verified target object does not match a positioning location of the target object.

Therefore, according to the implementation of the present specification, authenticity of the video image can be accurately and efficiently determined without performing technical verification on the video image, thereby achieving simpler video image authenticity determination and reducing costs for performing the video image authenticity determination.

In the present specification, the target object can be a person in the target area, or can be an article in the target area.

In the present specification, a method for determining, by the video detection unit 310, the quantity of to-be-verified target objects in the video image at the multiple moments and the to-be-verified location of each to-be-verified target object is the same as a specific implementation method in the video processing method above, and details are omitted here for simplicity.

In the present specification, the positioning signals obtained by the signal receiving unit 320 include signals obtained by a radar and indicating location coordinates of the target objects and/or signals obtained by at least three radio receivers and indicating RSSIs of received radio waves.

When the positioning signals include the signals obtained by the radar and indicating the location coordinates of the target objects, the signal processing unit 320 is further configured to determine, based on the signals indicating the location coordinates of the target objects, a quantity of positioned location coordinates as the quantity of target objects positioned at each moment; and determine, based on the signals indicating the location coordinates of the target objects, location coordinates of multiple positioned target objects as the positioning location of each positioned target object at each moment.

In the present specification, when the target objects are moving persons or large moving articles, the positioning signals further include signals obtained by the radar and indicating moving speeds of the target objects. In this case, the signal processing unit is further configured to determine moving speeds of multiple target objects based on the signals indicating the moving speeds of the target objects; and correct, based on the moving speeds and a predetermined speed range, the quantity of target objects positioned at each moment and the positioning location of each positioned target object.

That is, in the present specification, the signal processing unit 320 can first use all positioning signals obtained by the radar as positioning locations of the target objects, and then based on a moving speed of a target object corresponding to each positioning location, remove an object with a positioning location beyond a predetermined speed range as a non-target object, so that filtered positioning signals are obtained to correct the obtained positioning locations of each target object at the multiple moments and the quantity of positioned target objects.

Therefore, in the present specification, the positioning locations of the target objects can be determined without cooperation with the target objects, so as to determine authenticity of the video image.

When the positioning signals include the signals obtained by the at least three radio receivers and indicating the RSSIs of the received radio waves, and the radio waves are radio signals having identification codes and transmitted by radio transmitters carried by the target objects, the signal processing unit 320 is further configured to determine, based on the signals indicating the RSSIs of the received radio waves, a quantity of the obtained identification codes as the quantity of target objects positioned at each moment; and determine, based on RSSIs of three radio waves corresponding to each obtained identification code, a coordinate location of each identification code as the positioning location of each positioned target object at each moment.

Therefore, in the present specification, a location of a target object can be more accurately calculated by using a three-point positioning method. In addition, because there is no signal interference, such a case is not only applicable to obtaining a positioning signal of a target object that is a moving person or a large moving article, but also applicable to obtaining a positioning signal of a stationary person and article.

In the present specification, the video processing apparatus further includes a calculation processing unit, configured to determine mapping relationships between the multiple obtained identification codes and multiple target object images in the video image.

Specifically, the calculation processing unit can identify a to-be-verified location of a to-be-verified target object by using a positioning location of a target object corresponding to each identification code, so as to establish a mapping relationship between each identification code and a corresponding target object image in the video image.

Further, the calculation processing unit is further configured to determine, based on a target identification code and the mapping relationships, a target object image corresponding to the target identification code; and generate video content corresponding to the target identification code based on a location and a predetermined size of the target object image corresponding to the target identification code in the video image at each moment.

Therefore, when the target object is a person, privacy of another person other than a person corresponding to the target identification code can be ensured.

Figure 7:
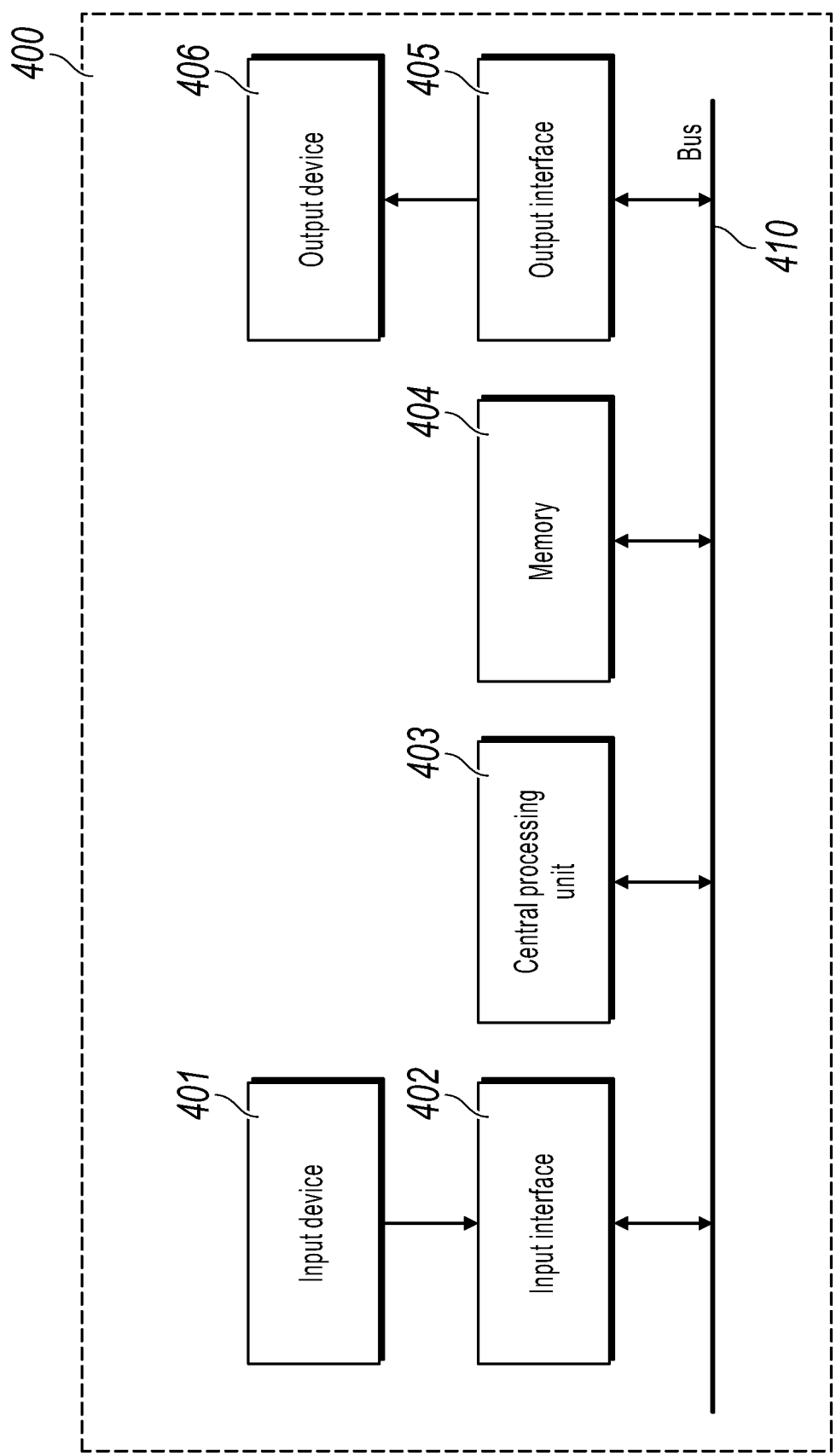
FIG. 7 is a schematic structural diagram illustrating a video processing device, according to an implementation of the present specification.

FIG. 7 is a schematic diagram illustrating a hardware structure of a video processing device, according to an implementation of the present specification. As shown in FIG. 7, the video processing device 400 includes an input device 401, an input interface 402, a central processing unit 403, a memory 404, an output interface 405, and an output device 406. The input interface 402, the central processing unit 403, the memory 404, and the output interface 405 are connected to each other by using a bus 410, and the input device 401 and the output device 406 are separately connected to the bus 410 by using the input interface 402 and the output interface 405, so as to be connected to other components of the video processing device 400.

Specifically, the input device 401 receives input information from the outside, and transmits the input information to the central processing unit 403 by using the input interface 402. The central processing unit 403 processes the input information based on computer executable instructions stored in the memory 404 to generate output information, temporarily or permanently stores the output information in the memory 404, and then transmits the output information to the output device 406 by using the output interface 405. The output device 406 outputs the output information to the outside of the video processing device 400 for use by a user.

In other words, the video processing device shown in FIG. 7 can also be implemented as including a memory that stores computer executable instructions, and a processor. When executing the computer executable instructions, the processor can implement the video processing method and apparatus described with reference to FIG. 4 and FIG. 5.

The functional blocks shown in the structural block diagrams above can be implemented as hardware, software, firmware, or a combination thereof. For implementation as hardware, the video processing device can be, for example, an electronic circuit, an application-specific integrated circuit (ASIC), appropriate firmware, a plug-in, a function card, etc. For implementation as software, an element in the present specification is a program or a code segment that is used to execute a needed task. The program or the code segment can be stored in a machine readable medium, or transmitted on a transmission medium or a communications link by using a data signal carried over a carrier. The "machine readable medium" can include any medium capable of storing or transmitting information. Examples of the machine readable medium include an electronic circuit, a semiconductor memory device, a ROM, a flash memory, an erasable ROM (EROM), a floppy disk, a CD-ROM, an optical disk, a hard disk, an optical fiber medium, a radio frequency (RF) link, etc. The code segment can be downloaded over a computer network such as the Internet or an intranet.

It should further be noted that, specific implementations of the present specification are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily need a particular execution order to achieve the desired results. In some implementations, multi-tasking and concurrent processing is feasible or can be advantageous.

The descriptions above are merely specific implementations of the present specification. It can be clearly understood by a person skilled in the art that, for the purpose of convenient and brief description, for a detailed working process of the system, device, and unit described above, reference can be made to a corresponding process in the method embodiments above, and details are omitted here for simplicity. It should be understood that, the protection scope of the present specification is not limited to the descriptions above. Any modification or replacement readily figured out by a person skilled in the art within the technical scope disclosed in the present specification shall fall within the protection scope of the present specification.

What is claimed is:

1. A computer-implemented method, comprising:
identifying, by one or more processing devices, in a video of a target area captured by a video acquisition device, a first number of target objects in the video at each of multiple time points, and a first location of each of the first number of target objects within the target area at the corresponding time points;
receiving, from a signal acquisition device distinct from the video acquisition device, position signals of the corresponding target objects in the target area at each of the multiple time points;
determining, based on the position signals, a second number of target objects at each of the multiple time points and a second location of each of the second number of target objects within the target area at the corresponding time points;
determining that, at each of the multiple time points, the first number equals the second number;
determining that, at each of the multiple time points, the first location of each target object matches the second location of the target object; and
in response to determining that, at each of the multiple time points, the first number equals the second number, and that, at the corresponding time points, the first location of each target object matches the second location of the target object, determining that the video is authentic.

2. The computer-implemented method of claim 1, wherein the position signals comprise signals obtained by a radar, and wherein the position signals indicate location coordinates of each of the second number of target objects.

3. The computer-implemented method of claim 2, wherein the signals obtained by the radar indicate movement speeds of objects in the target area, and further comprising:
determining a movement speed of each of multiple objects in the target area based on the signals indicating the movement speeds of the multiple objects;
determining that a first object of the multiple objects has a movement speed outside a predetermined speed range;
based on determining that the first object has a movement speed outside the predetermined speed range, determining that the first object is a non-target object; and
based on determining that the first object is a non-target object, correcting, for each of the multiple time points, the second number of target objects.

4. The computer-implemented method of claim 1, wherein the position signals comprise signals obtained by at least three radio receivers at each of the multiple time points,
wherein the signals obtained by the at least three radio receivers indicate received signal strengths of received radio waves, and
wherein the received radio waves are radio signals having identification codes and transmitted by radio transmitters carried by the target objects.

5. The computer-implemented method of claim 4, wherein determining, based on the position signals, the second number of target objects at each of the multiple time points and the second location of each of the second number of target objects at the corresponding time points comprises:
determining, based on the signals obtained by the at least three radio receivers, the second number of target objects at each of the multiple time points as a number of identification codes received at the corresponding time points;
calculating, based on received signal strengths of three radio waves corresponding to each received identification code, a coordinate position corresponding to the received identification code; and
determining the location of each of the second number of target objects at each of the multiple time points as a coordinate position corresponding to a respective identification code.

6. The computer-implemented method of claim 4, further comprising:
determining a mapping relationship between each received identification code and a corresponding target object in the video.

7. The computer-implemented method of claim 6, further comprising:
determining, based on a target identification code and a corresponding mapping relationship, a selected target object corresponding to the target identification code; and
generating video content corresponding to the selected target object based on a position and a size of the selected target object.

8. A non-transitory, computer-readable medium storing one or more instructions that, when executed by one or more processing devices, cause the one or more processing devices to perform operations comprising:

identifying, by the one or more processing devices, in a video of a target area captured by a video acquisition device, a first number of target objects in the video at each of multiple time points, and a first location of each of the first number of target objects within the target area at the corresponding time points;

receiving, from a signal acquisition device distinct from the video acquisition device, position signals of the corresponding target objects in the target area at each of the multiple time points;

determining, based on the position signals, a second number of target objects at each of the multiple time points and a second location of each of the second number of target objects within the target area at the corresponding time points;

determining that, at each of the multiple time points, the first number equals the second number;

determining that, at each of the multiple time points, the first location of each target object matches the second location of the target object; and in response to determining that, at each of the multiple time points, the first number equals the second number, and that, at the corresponding time points, the first location of each target object matches the second location of the target object, determining that the video is authentic.

9. The computer-readable medium of claim 8, wherein the position signals comprise signals obtained by a radar, and wherein the position signals indicate location coordinates of each of the second number of target objects.

10. The computer-readable medium of claim 9, wherein the signals obtained by the radar indicate movement speeds of objects in the target area, and wherein the operations further comprise:

determining a movement speed of each of multiple objects in the target area based on the signals indicating the movement speeds of the multiple objects;

determining that a first object of the multiple objects has a movement speed outside a predetermined speed range;

based on determining that the first object has a movement speed outside the predetermined speed range, determining that the first object is a non-target object; and based on determining that the first object is a non-target object, correcting, for each of the multiple time points, the second number of target objects.

11. The computer-readable medium of claim 8, wherein the position signals comprise signals obtained by at least three radio receivers at each of the multiple time points, wherein the signals obtained by the at least three radio receivers indicate received signal strengths of received radio waves, and wherein the received radio waves are radio signals having identification codes and transmitted by radio transmitters carried by the target objects.

12. The computer-readable medium of claim 11, wherein determining, based on the position signals, the second number of target objects at each of the multiple time points and the second location of each of the second number of target objects at the corresponding time points comprises:

determining, based on the signals obtained by the at least three radio receivers, the second number of target objects at each of the multiple time points as a number of identification codes received at the corresponding time points;

calculating, based on received signal strengths of three radio waves corresponding to each received identification code, a coordinate position corresponding to the received identification code; and determining the location of each of the second number of target objects at each of the multiple time points as a coordinate position corresponding to a respective identification code.

13. The computer-readable medium of claim 11, wherein the operations further comprise:

determining a mapping relationship between each received identification code and a corresponding target object in the video.

14. The computer-readable medium of claim 13, wherein the operations further comprise:

determining, based on a target identification code and a corresponding mapping relationship, a selected target object corresponding to the target identification code; and generating video content corresponding to the selected target object based on a position and a size of the selected target object.

15. A computer-implemented system, comprising:

one or more processing devices; and one or more computer memory devices interoperably coupled with the one or more processing devices and having tangible, non-transitory, machine-readable media storing one or more instructions that, when executed by the one or more processing devices, cause the one or more processing devices to perform one or more operations comprising:

identifying, by the one or more processing devices, in a video of a target area captured by a video acquisition device, a first number of target objects in the video at each of multiple time points, and a first location of each of the first number of target objects within the target area at the corresponding time points;

receiving, from a signal acquisition device distinct from the video acquisition device, position signals of the corresponding target objects in the target area at each of the multiple time points;

determining, based on the position signals, a second number of target objects at each of the multiple time points and a second location of each of the second number of target objects within the target area at the corresponding time points;

determining that, at each of the multiple time points, the first number equals the second number;

determining that, at each of the multiple time points, the first location of each target object matches the second location of the target object; and in response to determining that, at each of the multiple time points, the first number equals the second number, and that, at the corresponding time points, the first location of each target object matches the second location of the target object, determining that the video is authentic.

16. The computer-implemented system of claim 15, wherein the position signals comprise signals obtained by a radar, and wherein the position signals indicate location coordinates of each of the second number of target objects.

17. The computer-implemented system of claim 16, wherein the signals obtained by the radar indicate movement speeds of objects in the target area, and wherein the operations further comprise:

determining a movement speed of each of multiple objects in the target area based on the signals indicating the movement speeds of the multiple objects;

determining that a first object of the multiple objects has a movement speed outside a predetermined speed range;

based on determining that the first object has a movement speed outside the predetermined speed range, determining that the first object is a non-target object; and based on determining that the first object is a non-target object, correcting, for each of the multiple time points, the second number of target objects.

18. The computer-implemented system of claim 15, wherein the position signals comprise signals obtained by at least three radio receivers at each of the multiple time points, wherein the signals obtained by the at least three radio receivers indicate received signal strengths of received radio waves, and wherein the received radio waves are radio signals having identification codes and transmitted by radio transmitters carried by the target objects.

19. The computer-implemented system of claim 18, wherein determining, based on the position signals, the second number of target objects at each of the multiple time points and the second location of each of the second number of target objects at the corresponding time points comprises:

determining, based on the signals obtained by the at least three radio receivers, the second number of target objects at each of the multiple time points as a number of identification codes received at the corresponding time points;

calculating, based on received signal strengths of three radio waves corresponding to each received identification code, a coordinate position corresponding to the received identification code; and determining the location of each of the second number of target objects at each of the multiple time points as a coordinate position corresponding to a respective identification code.

20. The computer-implemented system of claim 18, wherein the operations further comprise:

determining a mapping relationship between each received identification code and a corresponding target object in the video.

21. The computer-implemented system of claim 20, wherein the operations further comprise:

determining, based on a target identification code and a corresponding mapping relationship, a selected target object corresponding to the target identification code; and generating video content corresponding to the selected target object based on a position and a size of the selected target object.

\* \* \* \* \*